US008163675B2

(12) United States Patent
Navarrete et al.

(10) Patent No.: US 8,163,675 B2
(45) Date of Patent: Apr. 24, 2012

(54) EMULSIFIER BASED ON POLYAMINES AND FATTY ACID/MALEIC ANHYDRIDE

(75) Inventors: Reinaldo Conrado Navarrete, Nanuet, NY (US); Hua Yu, Scarsdale, NY (US); Wangqi Hou, Chesterfield, VA (US); Mohammad Abdur Rahman, Pomona, NY (US)

(73) Assignee: Akzo Nobel N.V., Arnhem (NL)

( * ) Notice: Subject to any disclaimer, the term of this patent is extended or adjusted under 35 U.S.C. 154(b) by 1797 days.

(21) Appl. No.: 11/254,271

(22) Filed: Oct. 20, 2005

(65) Prior Publication Data
US 2007/0093393 A1    Apr. 26, 2007

(51) Int. Cl.
C09K 8/32 (2006.01)
E21B 21/00 (2006.01)
(52) U.S. Cl. .......... 507/131; 175/65; 507/129; 507/133
(58) Field of Classification Search .......... 507/131, 507/133, 129
See application file for complete search history.

(56) References Cited

U.S. PATENT DOCUMENTS

| 3,169,113 A | 2/1965 | Kirkpatrick et al. ......... 252/8.55 |
| 4,306,980 A * | 12/1981 | Brandt et al. ................ 507/103 |
| 4,501,672 A | 2/1985 | Connell et al. ............. 252/8.5 M |
| 4,508,628 A | 4/1985 | Walker et al. ................ 252/8.5 P |
| 4,658,036 A | 4/1987 | Schilling ........................ 548/513 |
| 5,174,913 A | 12/1992 | Alford et al. ................ 252/8.555 |
| 5,260,268 A | 11/1993 | Forsberg et al. .............. 507/133 |
| 5,330,662 A | 7/1994 | Jahnke et al. .............. 252/8.551 |
| 5,582,792 A | 12/1996 | Dougherty et al. ............. 422/16 |
| 5,593,953 A | 1/1997 | Malchow, Jr. ................. 507/135 |
| 5,759,485 A | 6/1998 | Fischer et al. ................... 422/16 |
| 5,928,418 A | 7/1999 | Tamaki et al. ................. 106/277 |
| 6,006,831 A | 12/1999 | Schlemmer et al. ..... 166/250.01 |
| 6,156,708 A | 12/2000 | Brookey et al. ............... 507/102 |
| 2003/0061968 A1 | 4/2003 | Matherly et al. ............ 106/281.1 |
| 2003/0162668 A1 | 8/2003 | Kirsner et al. ................. 507/100 |

FOREIGN PATENT DOCUMENTS

| EP | 0 913 384 A2 | 5/1999 |
| WO | WO 86/03987 | 7/1986 |
| WO | WO 89/11516 | 11/1989 |

OTHER PUBLICATIONS

International Search Report for International Application No. PCT/EP2006/067320, Jan. 10, 2007.

\* cited by examiner

Primary Examiner — T. J. Kugel
(74) Attorney, Agent, or Firm — Ralph J. Mancini

(57) ABSTRACT

The present invention generally relates to a polyamide emulsifier, to a drilling fluid composition that comprises said emulsifier and to a method of drilling a borehole into a subterranean formation utilizing the drilling fluid composition of the invention.

26 Claims, 1 Drawing Sheet

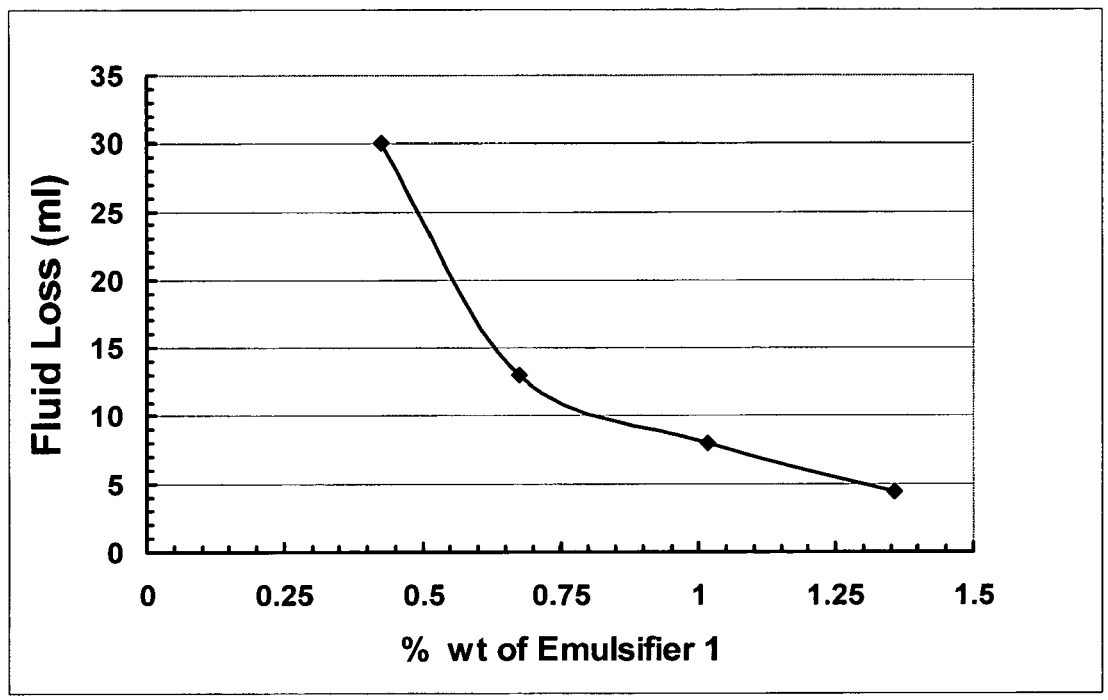

US 8,163,675 B2

EMULSIFIER BASED ON POLYAMINES AND FATTY ACID/MALEIC ANHYDRIDE

FIELD OF THE INVENTION

The present invention generally relates to emulsifiers for oil-based drilling muds based on polyamines and fatty acid/maleic anhydride. The invention also relates to oil or synthetic based drilling fluids comprising the emulsifiers of the invention and to drilling methods utilizing same.

BACKGROUND OF THE INVENTION

A drilling fluid or mud is a specially designed fluid that is circulated through a wellbore as the wellbore is being drilled to facilitate the drilling operation. Drilling fluids facilitate the removal of drill cuttings from the wellbore, cool and lubricate the drill bit, aid in supporting the drill pipe and drill bit, and provide a hydrostatic head to maintain the integrity of the wellbore walls thereby minimizing the potential for well blowouts. Specific drilling fluid systems are selected to optimize a drilling operation in accordance with the characteristics of a particular geological formation.

Oil or synthetic-based muds, or invert emulsions, are normally used to drill swelling or sloughing shales, salt, gypsum, anhydrite or other evaporite formations, hydrogen sulfide-containing formations, and hot (greater than about 300° F.) holes, but may be used in other holes penetrating a subterranean formation as well. This class of drilling fluids typically contains oil or a synthetic oil or other synthetic material or synthetic fluid ("synthetic") as the continuous phase and may also contain water which is dispersed in the continuous phase by emulsification so that there is no distinct layer of water in the fluid. The term "oil mud" or "oil or synthetic-based mud" typically means an invert oil mud emulsion or invert emulsion. An all oil mud simply comprises 100% oil by volume as the liquid phase; that is, there is no aqueous internal phase. An invert emulsion drilling fluid may commonly comprise between about 50:50 to 95:5 by volume oil phase to water phase.

Invert emulsions used in drilling typically comprise: a base oil or synthetic fluid for the external phase; a saline, aqueous solution for the internal phase (typically a solution comprising about 30% calcium chloride); and other agents or additives for suspension, fluid loss, density, oil-wetting, emulsification, filtration, and rheology control.

U.S. Pat. No. 6,006,831 (the '831 patent) generally discloses electrical well logging fluids and a method of using same. At column 12, starting at line 40, the '831 patent describes emulsifiers obtained by reaction of polyamines with a combination of fatty acids and basic acids such as maleic acids and fumaric acids. There is no disclosure, however, of the specific emulsifiers of the present invention derived from maleated tall oil fatty acid and higher polyamines or their effectiveness as emulsifiers in high temperature/high pressure applications.

U.S. Pat. No. 4,508,628 discloses fast drilling invert emulsion drilling fluids. The preferred polyamide emulsifiers are prepared by first reacting a polyamine with fatty acid in order to form a amidoamine and thereafter reacting the amidoamine intermediate with a dicarboxylic acid, preferably maleic or fumeric acid. It is apparent from the disclosure of this document, however, that the polyamine is limited to very short chain polyamines (Column #5 line 30). Additionally, the emulsifiers of this patent have to be dissolved in solvents to make it liquid at room temperature.

U.S. Pat. No. 3,169,113 discloses emulsifiers for water-in-oil acidic fracturing fluids. The disclosed emulsifier has two components:
(a) a 9-18 carbon monocarboxylic acid fatty acid salt of a partial amide of a polyalkyllene polyamine with 2-6 carbon alkylene groups and 3-5 amino nitrogens in which at least two amino groups are amidified with 9-18 carbon monocarboxylic fatty acids and wherein there is at least one nonamidified amino group forming a salt with the acid and,
(b) a polyamide of an alkylene polyamine with 2-6 carbon alkylene groups and 2-5 amino nitrogens and a 9-18 carbon monocarboxylic fatty acid.

U.S. Pat. No. 4,501,672 discloses fluid loss reducing additives for oil-based working fluids. The additive is obtained by reacting 1 mole of dialkylene triamine with 2 moles of fatty acid. Example 1 specifically covers the bridging of diethylenetriamine dioleylamide with maleic anhydride.

WO 89/11516 discloses oil-based emulsifiers for drilling fluids that are the reaction product of one or two moles of an amide-amine or a hydroxylalkylamide with one to five moles of a dicarboxylic acid or an acid anhydride. Starting on page 5 of this document it is clear that the use of very short chain polyamines is contemplated.

U.S. Pat. No. 4,658,036 discloses an invert emulsion and a process of preparing same. The emulsifiers are prepared by reacting at least one tall oil fatty acid with acrylic acid, maleic anhydride, or fumaric acid, followed by reaction with diethylene triamene and at least one tall oil fatty acid in order to give the invert emulsifier.

With space at some well sites limited, such as on offshore platforms, and with increasing costs of transport of materials to a wellsite, there is industry-wide interest, on-going need for more efficient and concentrated drilling fluid additives and for drilling fluids which can be formulated and maintained with fewer additives in lesser amounts than commonly utilized with prior art drilling fluids.

SUMMARY OF THE INVENTION

The present invention generally relates to emulsifiers for oil-based drilling muds based on polyamines and fatty acid/maleic anhydride. The invention also relates to oil or synthetic based drilling fluids comprising the emulsifiers of the invention and to drilling methods utilizing same.

DETAILED DESCRIPTION OF THE FIGURES

FIG. 1 is a graphical depiction of the HTHP Fluid loss property of diesel based drilling fluids with different levels of Emulsifier 1 incorporation after aging at 300° F. for 16 hrs.

DETAILED DESCRIPTION OF THE INVENTION

The polyamides of the invention are derived from fatty acid/maleic anhydride and higher polyamines other than diethylenetriamine ("DETA"). They provide emulsification and allow concentrated products, either solids or liquids, with superior properties. Conventional emulsifiers for oil-based mud will usually degrade under high-temperature and pressure conditions, which leads to the deterioration of the oil-based mud. This requires that more emulsifier be put into the mud system in order to maintain the desired properties, which can substantially increase the cost of the system. The emulsifier of the present invention is much more effective under high temperature and high pressure conditions thus reducing the amount of additional emulsifier required to emulsify the system, thereby improving the performance and cost of the system. Additionally, the polyamide emulsifiers of the invention are liquid at room temperature and do not require the addition of a solvent.

The polyamide emulsifiers of the invention are depicted by the general formula

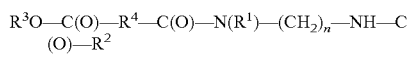
$R^3O\text{—}C(O)\text{—}R^4\text{—}C(O)\text{—}N(R^1)\text{—}(CH_2)_n\text{—}NH\text{—}C(O)\text{—}R^2$ where $R^1$ and $R^2$ are independently selected from $C_{10}$-$C_{24}$ alkylene groups, $R^3$ is a hydrogen or a $C_1$-$C_5$ alkyl group, $R^4$ is a $C_1$-$C_5$ alkyl/alkene group, in another embodiment a $C_2$-$C_4$ alkyl/alkene group and n is an integer of from 2-5, in another embodiment, 3-4. In another embodiment, $R^1$ and $R^2$ are selected from $C_{12}$-$C_{22}$ alkylene groups and in still another embodiment, $R^1$ and $R^2$ are selected from $C_{14}$-$C_{18}$ alkylene groups. Ideally, $R^1$ and $R^2$ are derived from a fatty acid source. Preferred fatty acid sources include, but are not limited to coconut, palm, palm kernal, soybean, tallow, tall oil and mixtures thereof. Ideal sources include, but are not limited to tall oil and tallow.

A preferred polyamide emulsifier according to the invention is represented by the formula:

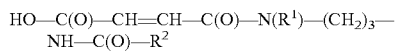
$HO\text{—}C(O)\text{—}CH\text{=}CH\text{—}C(O)\text{—}N(R^1)\text{—}(CH_2)_3\text{—}NH\text{—}C(O)\text{—}R^2$ where $R^1$ and $R^2$ are independently selected from $C_{10}$-$C_{24}$ alkylene groups. Preferably, $R^1$ and $R^2$ are derived from tall oil.

The emulsifier of the invention is highly effective with low dosage use, and when used in a typical oil-based drilling fluid formulation, produces a drilling fluid with high electric stability. Additionally, the emulsifier of the invention is highly concentrated, i.e., up to 100% active component, and is lime free, i.e., there is no need to add lime to the mud system in order to activate the emulsifier. The emulsifier of the invention also has low fluid loss (filtration properties) at high temperature and pressure using relatively low dosages, without the necessity of utilizing other fluid loss or filtration additives.

The polyamide emulsifier of the invention is generally prepared from the condensation reaction between fatty acids (I) and polyamines (II). The fatty acids and polyamines are reacted in such proportion as to create an amidoamine intermediate product (III) having a mole ratio of the reactive acid sites to amine sites ranges from about 0.25:1 to about 0.75:1 and most preferably about 0.5:1.

This amidoamine intermediate (III) is then further reacted with maleic anhydride (IV) at a molar ratio of 0.75 to 1.25 in order to get the polyamide emulsifier of the present invention (V).

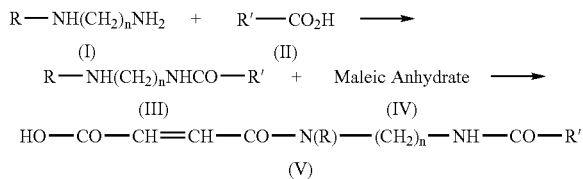

The fatty acids (I) employable in the preparative reaction are generally selected from fatty acids of the formula: $R\text{—}CO_2$ wherein R is a saturated or unsaturated, branched or straight chain, substituted or unsubstituted alkyl group having from 6 to 22 carbon atoms. Tall oil fatty acid and/or tallow are particularly preferred fatty acid sources for use in the process for making the emulsifier of the present invention. Tall oil is a commonly known product made from acid treatment of alkaline liquors obtained from the manufacture of wood pulp, and tall oil and its derivatives have previously been used in oil-well drilling muds.

The polyamines employable in the aforementioned process are generally of the formula:

$R\text{—}NH(CH_2)_nNH_2$ where R is a saturated or unsaturated, branched or straight chain, substituted or unsubstituted alkyl group having from 6 to 22 carbon atoms. Particularly preferred are polyamines, fatty polyamine, diamines, including mono- or dialkyl symmetrical or asymmetrical ethylene diamines, propane diamines and polyamine analogs of the above. Suitable commercial fatty polyamines are Duomeen C(N-coco-1,3 diaminopropane), Duomeen S(N-soya-1,3, diaminopropane, Duomeen T (N-tallow, 1,3 diamino propane), and/or Duomeen O(N-oleyl, 1,3 diamino propane). Duomeens are commercially available from Akzo Nobel Surface Chemistry LLC, Chicago, Ill.

Maleic Anhydrate is the preferred anhydride to utilize in the reaction of the present invention. However, one of ordinary skill in the art would clearly recognize that other anhydrides could be utilized including, but not limited to glutaric anhydride, succinic anhydrates, and the like, and mixtures thereof.

The reaction is generally carried out under stequeometric conditions, i.e. 1 mole of Duomeen T and 0.5 to 1.5 moles, preferably 1 mole of tall oil fatty acid (TOFA) on the first step and on a second step 1 mole of the intermediate reacted with 0.75 to 1.25 moles, preferably 1 mole of maleic anhydrate. The reaction temperature of the first step is generally from 150° C. to 175° C., preferably about 165° C. and is generally run for about 10-17 hrs until acid is reduced to less than about <0.2 meq/g. The second step is generally carried out at temperatures of between 80 and 100° C. (Rxn is exothermic) for 2 to 3 hrs until amine number falls below about 0.5 meq/g) and acid number is less than 1.5 meq/g. Use of a catalyst is not required in either step of the reaction.

The emulsifier of the invention is a superior additive for oil or synthetic based drilling fluids, affording enhanced emulsification, and improved electrical stability and fluid loss control, with significantly less volume of additive than previously known with prior art drilling fluid additives. The emulsifier of the invention effects satisfactory emulsification at addition rates typically about one-third the quantity commonly needed for emulsification of oil or synthetic based fluids with prior art emulsifiers. Typically, three pounds to about five pounds of the emulsifier of the invention per barrel of drilling fluid can be effective for emulsification. Even lower quantities can improve the electrical stability and filtration control of drilling fluids, even if already emulsified with other emulsifiers.

Typically, anywhere between about 0.5 to 1.5 wt. % of the emulsifier of the invention is employed in drilling fluid compositions, in another embodiment, between about 0.75 to 1.25 wt % is employed. Typical oil based drilling fluids containing the emulsifier of the invention are based on oils (diesel or polyolefin), and may also contain components such as organoclay, brine, weighting agents, dispersants, stabilizers, and barite. Additional components are well within the knowledge of one of ordinary skill in the art.

The emulsifier of the invention does not require a carrier, is highly active and is believed to be useful with all or substantially all synthetic and oil-based systems known to be effective for drilling fluids. The emulsifier of the invention may also impart a higher viscosity to the drilling fluid and thus is preferably added to the base drilling fluid before any weighting agents are added.

The present emulsifier operates efficiently at high temperatures and pressures, and is stable even at temperatures up to about 300° F. without filtration additives and up to about 350° F. with filtration additives. Adding wetting agents along with the product of the invention in an emulsifier package may improve the oil-wetting nature of the drilling fluid in some base oils but will not be needed in others. Wetting agents may also improve the rheological stability at temperatures up to about 300° F. and further enhance performance of some fluid systems.

The drilling fluid composition of the invention preferably contains at least one oil or synthetic based drilling oil. Ruch drilling oils are known as oil muds and are readily known to those skilled in the art. The drilling fluid composition of the invention also preferably includes brine. In most cases, a sodium, calcium and or magnesium brine is employed.

The method of the invention comprises adding the present polyamide emulsifier to an oil or synthetic based drilling fluid or employing a drilling fluid comprising the polyamide emulsifier of the invention in drilling a borehole in a subterranean formation. In another embodiment, the method of the invention comprises adding the polyamide emulsifier of the invention to oil or synthetic based drilling fluid to facilitate emulsification of the drilling fluid or the formation of invert emulsions. Finally, the invention relates to a method of enhancing the rate of penetration while drilling a well which comprises circulating a drilling fluid composition according to the invention throughout a borehole while simultaneously rotating a string of drill pipe containing a rotary drill bit on its lower end in contact with the bottom of the borehole, thereby facilitating the removal of drill cuttings formed by said drill bit from the borehole.

The oil or synthetic based drilling fluids of the invention may also include a variety of optional ingredients known to one of ordinary skill in the art. Such optional ingredients include, but are not limited to fluid loss control agents, rheology modifiers, wetting agents, and the like.

The invention will now be exemplified by the following non-limiting examples.

EXAMPLE 1

Preparing the Drilling Fluids

The diesel based drilling fluids used in the following non-limiting examples were prepared by mixing with 20 to 30 wt % of #2 Diesel oil, 0.25 to 1.5 wt % of the emulsifier, 0.3 to 1 wt % of organoclay, 5 to 15 wt % of $CaCl_2$ solution (25 wt % active), and 50 to 70 wt % Barite (200 microns of top size) at 7000 to 12000 rpm for 30 to 90 mins in a typical laboratory drilling fluid mixer.

EXAMPLE 2

Measuring Drilling Fluid Performance Properties

Drilling fluid rheology measurements were conducted using a Fann 35A Viscometer with an R1-B1 concentric cylinder geometry at 120° F. After measuring the viscosity @ 600 rpm (DR1), then @ 300 (DR2), 200, 100, 6, and 3 rpms, the Plastic Viscosity and Yield Point were calculated according to the following formulae:

*Plastic Viscosity (PV)=DR1−DR2*

*Yield Point (YP)=2DR2−DR1.*

Drilling fluid Fluid Loss property was measured according to the American Petroleum Institute (API) Recommended Practice 13B (RP 13B), 12$^{th}$ Ed (Sep. 1, 1988), on Section 3.4 of High-Temperature/High-Pressure Filtration Test, p11-13. Drilling fluid emulsion stability measurement was conducted using OFI Testing Equipment (Houston, Tex.) Emulsion Stability Meter using a standard procedure.

EXAMPLE 3

TABLE 1

Preparation and Analytical Results of Emulsifier 1 and 2

|  | Emulsifier 1 | Emulsifier 2 |
| --- | --- | --- |
| Molar Ratio of TOFA:Duomeen T:MA | 1.1:1:1.08 | 1:1:1 |
| Amine content of the final product (meq/g) | 0.287 | 0.104 |
| Acid content of the final product (meq/g) | 1.208 | 1.444 |

EXAMPLE 4

TABLE 2

HTHP Performance of diesel based drilling fluids with 1 wt. % of the emulsifier before and after aging at 300° F. for 16 hrs

|  | Before Aging | | After Aging | |
| --- | --- | --- | --- | --- |
|  | Emulsifier 1 | Emulsifier 2 | Emulsifier 1 | Emulsifier 2 |
| Plastic Viscosity (cP) | 28.5 | 29 | 30.5 | 32 |
| Yield Point (lb/sq. ft) | 23 | 24 | 14 | 27 |
| Electric Stability (v) | 900 | 1079 | 781 | 980 |
| Fluid Loss (ml) | — | — | 8 | 9.2 |

EXAMPLE 5

FIG. 1 is a graphical depiction of the HTHP Fluid loss property of diesel based drilling fluids with different levels of Emulsifier 1 incorporation after aging at 300° F. for 16 hrs.

We claim:

1. A compound of the formula:

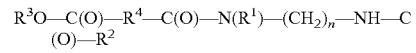

where $R^1$ and $R^2$ are independently selected from $C_{10}$-$C_{24}$ alkylene groups, $R^3$ is a hydrogen or a $C_1$-$C_5$ alkyl group, $R^4$ is a $C_1$-$C_5$ alkyl or alkene group, and n is an integer of from 2-5.

2. The compound of claim 1 wherein $R^1$ and $R^2$ are derived from a fatty acid source selected from coconut, palm, palm kernal, soybean, tallow, tall oil and mixtures thereof.

3. The compound of claim 2 wherein said fatty acid source is tall oil fatty acid.

4. The compound of claim 1 having the formula:

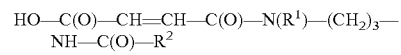

where $R^1$ and $R^2$ are independently selected from $C_{10}$-$C_{24}$ alkylene groups.

5. An emulsifier which comprises an emulsifying effective amount of at least one compound according to claim 4.

6. An emulsifier which comprises an emulsifying effective amount of at least one compound according to claim 1.

7. The emulsifier of claim 6 which is liquid at room temperature without the addition of a solvent.

8. The compound of claim 1 wherein $R^1$ and $R^2$ are selected from $C_{12}$-$C_{22}$ alkylene groups.

9. The compound of claim 1 wherein $R^1$ and $R^2$ are selected from $C_{14}$-$C_{18}$ alkylene groups.

10. A drilling fluid composition comprising an oil or synthetic base and at least one polyamide emulsifier of the following formula:

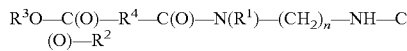
$$R^3O-C(O)-R^4-C(O)-N(R^1)-(CH_2)_n-NH-C(O)-R^2$$

where $R^1$ and $R^2$ are independently selected from $C_{10}$-$C_{24}$ alkylene groups, $R^3$ is a hydrogen or a $C_1$-$C_5$ alkyl group, $R^4$ is a $C_1$-$C_5$ alkyl/alkene group, and n is an integer of from 2-5.

11. The composition of claim 10 wherein $R^1$ and $R^2$ are derived from a fatty acid source selected from coconut, palm, palm kernal, soybean, tallow, tall oil and mixtures thereof.

12. The composition of claim 11 wherein said fatty acid source is tall oil fatty acid.

13. The composition of claim 10 wherein said at least one emulsifier is present in an amount of from 0.5 to about 1.5 wt % based on the total weight of the drilling fluid composition.

14. The composition of claim 13 wherein said at least one emulsifier is present in an amount of from 0.75 to about 1.25 wt % based on the total weight of the drilling fluid composition.

15. The composition of claim 10 wherein $R^1$ and $R^2$ are selected from $C_{12}$-$C_{22}$ alkylene groups.

16. The composition of claim 10 wherein $R^1$ and $R^2$ are selected from $C_{14}$-$C_{18}$ alkylene groups.

17. The composition of claim 10 wherein said emulsifier is of the formula:

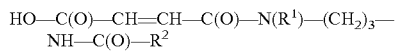
$$HO-C(O)-CH=CH-C(O)-N(R^1)-(CH_2)_3-NH-C(O)-R^2$$

where $R^1$ and $R^2$ are independently selected from $C_{10}$-$C_{24}$ alkylene groups.

18. The drilling fluid composition of claim 10 further comprising at least one of wetting agents, brine, organoclays, barite, and mixtures thereof.

19. The drilling fluid composition of claim 10, wherein said composition is lime free.

20. A method for drilling a borehole in a subterranean formation, said method comprising employing an oil or synthetic based drilling fluid composition while drilling said borehole, wherein said composition comprises at least one oil or synthetic base and at least one polyamide emulsifier of the formula:

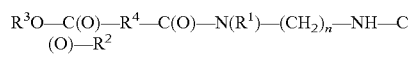
$$R^3O-C(O)-R^4-C(O)-N(R^1)-(CH_2)_n-NH-C(O)-R^2$$

where $R^1$ and $R^2$ are independently selected from $C_{10}$-$C_{24}$ alkylene groups, $R^3$ is a hydrogen or a $C_1$-$C_5$ alkyl group, $R^4$ is a $C_1$-$C_5$ alkyl/alkene group, and n is an integer of from 2-5.

21. The method of claim 20 wherein $R^1$ and $R^2$ are derived from a fatty acid source selected from coconut, palm, palm kernal, soybean, tallow, tall oil and mixtures thereof.

22. The method of claim 21 wherein said fatty acid source is tall oil fatty acid.

23. The method of claim 20 wherein $R^1$ and $R^2$ are selected from $C_{12}$-$C_{22}$ alkylene groups.

24. The method of claim 20 wherein $R^1$ and $R^2$ are selected from $C_{14}$-$C_{18}$ alkylene groups.

25. The method of claim 20 wherein said emulsifier is of the formula:

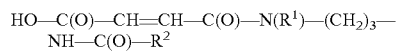
$$HO-C(O)-CH=CH-C(O)-N(R^1)-(CH_2)_3-NH-C(O)-R^2$$

where $R^1$ and $R^2$ are independently selected from $C_{10}$-$C_{24}$ alkylene groups.

26. A method of enhancing the rate of penetration rate while drilling a borehole in a subterranean formation which comprises circulating a drilling fluid composition throughout said borehole while simultaneously rotating a string of drill pipe containing a rotary drill bit on its lower end in contact with the bottom of the borehole, thereby facilitating the removal of drill cuttings formed by said drill bit from the borehole, wherein said drilling fluid composition comprises at least one polyamide emulsifier of claim 6.

* * * * *